US012361111B2

(12) United States Patent
Wu et al.

(10) Patent No.: US 12,361,111 B2
(45) Date of Patent: Jul. 15, 2025

(54) VERIFICATION METHOD AND VERIFICATION APPARATUS BASED ON ATTACKING IMAGE STYLE TRANSFER

(71) Applicant: National Tsing Hua University, Hsinchu (TW)

(72) Inventors: Shan-Hung Wu, Hsinchu (TW); Yan Ting Lee, Hsinchu (TW); I Luh Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1078 days.

(21) Appl. No.: 17/337,440

(22) Filed: Jun. 3, 2021

(65) Prior Publication Data

US 2022/0335114 A1 Oct. 20, 2022

(30) Foreign Application Priority Data

Apr. 20, 2021 (TW) .................... 110114045

(51) Int. Cl.
*H04L 9/08* (2006.01)
*G06F 3/0482* (2013.01)
(Continued)

(52) U.S. Cl.
CPC ............ *G06F 21/36* (2013.01); *G06F 3/0482* (2013.01); *G06F 18/214* (2023.01); *G06N 5/04* (2013.01);
(Continued)

(58) Field of Classification Search
CPC ...... G06F 21/36; G06F 3/0482; G06F 18/214; G06F 2221/2133; G06N 5/04;
(Continued)

(56) References Cited

U.S. PATENT DOCUMENTS 8,483,518 B2 7/2013 Zhu et al.
10,521,925 B1 12/2019 Gu et al.
(Continued)

FOREIGN PATENT DOCUMENTS

CN 108351932 7/2018
CN 108369615 8/2018
(Continued)

OTHER PUBLICATIONS

"Notice of allowance of Taiwan Counterpart Application", issued on May 27, 2022, p. 1-p. 4.

*Primary Examiner* — Quazi Farooqui
(74) *Attorney, Agent, or Firm* — JCIPRNET

(57) ABSTRACT

A verification method and a verification apparatus based on an attacking image style transfer are provided. The method includes the following steps. A style transfer is performed on a verification image for verifying an identity, so as to generate multiple stylized images having at least one style, in which the style transfer includes modifying a local pattern of the verification image while retaining a global pattern of the verification image. At least one of the verification image and the stylized images is processed to add an interference signal having at least one specific pattern for interfering with image recognition. And, the processed stylized images are prompted and a selection operation on the stylized images is received to verify an identity of an object executing the selection operation.

20 Claims, 8 Drawing Sheets
(5 of 8 Drawing Sheet(s) Filed in Color)

(51) Int. Cl.
*G06F 18/214* (2023.01)
*G06F 21/36* (2013.01)
*G06N 5/04* (2023.01)
*G06N 20/00* (2019.01)
*G06T 3/04* (2024.01)

(52) U.S. Cl.
CPC ............... *G06N 20/00* (2019.01); *G06T 3/04* (2024.01); *G06T 2200/24* (2013.01)

(58) Field of Classification Search
CPC ...... G06N 20/00; G06N 3/0464; G06N 3/088; G06N 3/09; G06N 3/0455; G06N 3/094; G06T 3/04; G06T 2200/24; G06T 11/00; G06V 10/774; H04L 9/08
See application file for complete search history.

(56) References Cited

U.S. PATENT DOCUMENTS

| | | | |
|---|---|---|---|
| 10,664,722 | B1 | 5/2020 | Sharma et al. |
| 2007/0201745 | A1 | 8/2007 | Wang et al. |
| 2011/0194737 | A1* | 8/2011 | Sharma ................ G07D 7/2033 |
| | | | 382/218 |
| 2020/0272726 | A1 | 8/2020 | Moe et al. |
| 2022/0277066 | A1* | 9/2022 | Levine ................ B42D 25/305 |

FOREIGN PATENT DOCUMENTS

| | | |
|---|---|---|
| CN | 108846274 | 11/2018 |
| CN | 109523611 | 3/2019 |
| CN | 109559363 | 4/2019 |
| CN | 109711136 | 5/2019 |
| CN | 110135145 | 8/2019 |
| CN | 110706221 | 1/2020 |
| CN | 111460422 | 7/2020 |
| CN | 111931156 | 11/2020 |
| TW | 201832127 | 9/2018 |
| TW | I682300 | 1/2020 |

* cited by examiner

VERIFICATION METHOD AND VERIFICATION APPARATUS BASED ON ATTACKING IMAGE STYLE TRANSFER

CROSS-REFERENCE TO RELATED APPLICATION

This application claims the priority benefit of Taiwan application serial no. 110114045, filed on Apr. 20, 2021. The entirety of the above-mentioned patent application is hereby incorporated by reference herein and made a part of this specification.

BACKGROUND

Technical Field

This disclosure relates to a verification method and a verification apparatus, and in particular to a verification method and a verification apparatus based on an attacking image style transfer.

Description of Related Art

A verification code is an automatic graphic test, which aims to distinguish between humans and bots, thereby blocking some automated programs, for example, a ticket grabbing program or a web crawler. These bots may maliciously access a website in large numbers, affecting the service and profit of the website. Nowadays, the verification code is widely applied and can be seen on many websites. Since the verification code has been widely used, many different verification code applications have appeared on the market.

Current verification codes may be divided into a text verification code and a graphic verification code according to their question types. The text verification code usually requires a user to input text in a graphic. Its security mainly depends on difficulty of text recognition, for example, distorted text in the graphic, so as to increase difficulty in bot recognition. The graphic verification code requires the user to select a specific category of graphics from multiple graphic options. However, with development of computer vision technology, the security of these verification codes is being threatened by automated programs.

Therefore, it is necessary to develop a verification code that can balance security and user experience.

SUMMARY

This disclosure provides a verification method and a verification apparatus based on an attacking image style transfer, which may simultaneously take into account security of a verification code and user experience.

The disclosure provides a verification method based on an attacking image style transfer, which is suitable for an electronic device equipped with a processor. The method includes the following steps. A style transfer is performed on a verification image that is configured to verify an identity, so as to generate multiple stylized images having at least one style, in which the style transfer includes modifying a local pattern of the verification image while retaining a global pattern of the verification image. At least one of the verification image and the stylized images is processed, so as to add an interference signal having at least one specific pattern that is configured to interfere with image recognition. In addition, the processed stylized images are prompted and a selection operation on the stylized images is received, so that an identity of an object executing the selection operation is verified accordingly.

The disclosure provides a verification apparatus based on an attacking image style transfer. The verification apparatus includes a generation device and a verification device. The generation device includes a first connection device, a first storage device that is configured to store a computer program, and a first processor coupled to the first connection device and the first storage device. The verification device includes an input device, a display device, a second connection device, a storage device that is configured to store a computer program, and a second processor coupled to the input device, the display device, the second connection device, and the second storage device. The first processor is configured to load and execute the computer program in the first storage device to perform a style transfer on a verification image that is configured to verify an identity, so as to generate multiple stylized images having at least one style. The style transfer includes modifying a local pattern of the verification image while retaining a global pattern of the verification image, and processing at least one of the verification image and the stylized images to add an interference signal having at least one specific pattern that is configured to interfere with image recognition, and generates a processed stylized image. The second processor is configured to load and execute the computer program in the second storage device to prompt the processed stylized images on the display device, and uses the input device to receive a selection operation on the stylized images, so that an identity of an object executing the selection operation is verified accordingly.

Based on the above, the verification method and the verification apparatus based on the attacking image style transfer of the disclosure apply the style transfer to the verification code, through modifying the style features in the local region and adding attacking features that may increase the difficulty in bot recognition of the stylized image or the original image, without modifying the overall content of the image. In this way, the verification code generated based on the disclosure may be easily operated by a human user, while simultaneously increase the difficulty in image recognition by the bot.

To make the above-mentioned more comprehensible, several embodiments accompanied by drawings are described in detail as follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE EMBODIMENTS

A main aim of the verification code is to distinguish between humans and bots, thereby reducing threat of bots to website services. Therefore, when evaluating a verification code, not only does it have to be done from a human's point of view, but also from a bot's point of view. In the embodiment of the disclosure, a style transfer is applied to a verification code, and concurrently, attacking features that may increase difficulty of bot recognition are added, and a task of the verification code is designed based on this stylized image. The embodiment of the disclosure retains a global pattern of the image and only modifies a local pattern of the image, therefore it may increase difficulty in image recognition by the bot without affecting user experience, and improves security of the verification code.

In the embodiment of the disclosure, each image is divided into image content and image style. The image content refers to the global pattern of the image, or a portion that affects human subjective perception, for example, a main object contained in the image. The image style refers to a regional graphic in the image, or a portion that does not affect human subjective perception, for example, a painting style such as a Van Gogh painting or an oil painting. These styles do not significantly affect human perception of the main object in the image.

The style transfer according to the embodiment of the disclosure is accomplished by replacing the style of the image while keeping the content. Since the content remains unchanged, the human may still interpret the content of the image from the image itself, while the replaced portion may mislead judgement of the bot. Therefore, through this design, a verification apparatus of the embodiment of the disclosure may distinguish between a real person and a bot.

Figure 1:
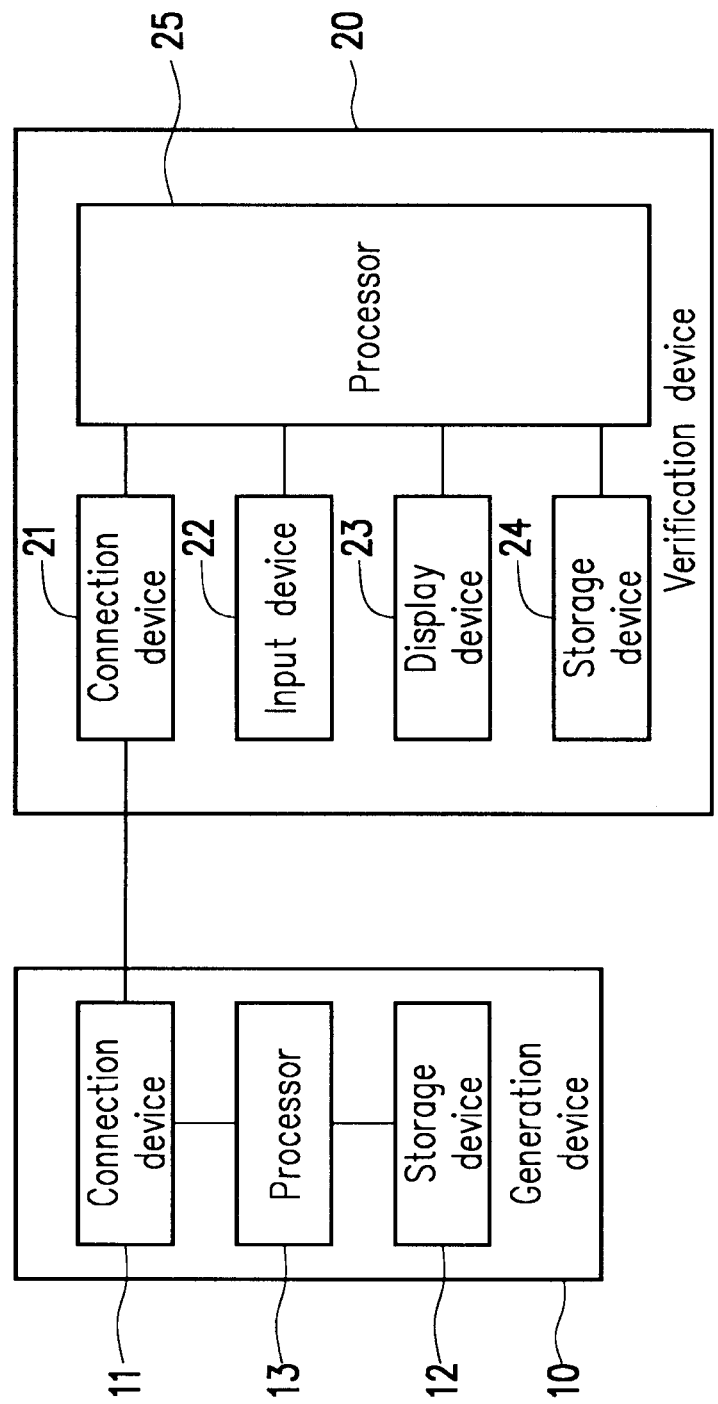
FIG. 1 is a block diagram of a verification apparatus based on an attacking image style transfer according to an embodiment of the disclosure.

FIG. 1 is a block diagram of a verification apparatus based on an attacking image style transfer according to an embodiment of the disclosure. With reference to FIG. 1, the verification apparatus based on the attacking image style transfer according to an embodiment of the disclosure includes a generation device 10 and a verification device 20. The generation device 10 is, for example, a computer device having computing capabilities such as a file server, a database server, an application server, a workstation, or a personal computer. The generation device 10 includes components such as a connection device 11, a storage device 12, and a processor 13. The verification device 20 is, for example, a computer device having computing capabilities such as a file server, a database server, an application server, a workstation, or a personal computer, or a mobile device such as a mobile phone or a tablet computer. The verification device 20 includes components such as a connection device 21, an input device 22, a display device 23, a storage device 24, and a processor 25. The generation device 10 and the verification device 20 may be independent physical devices, or may be integrated into a same physical device, and the disclosure is not limited thereto. Functions of each of the components in the generation device 10 and the verification device 20 are described as follows.

The connection device 11 and the connection device 21 are, for example, any wired or wireless interface devices corresponding to each other, which may be configured to transfer data between the generation device 10 and the verification device 20. In terms of wired connection means, the connection device 11 and the connection device 21 may be interfaces such as a universal serial bus (USB), an RS232, a universal asynchronous receiver/transmitter (UART), an internal integrated circuit (I2C), a serial peripheral interface (SPI), a display port or a thunderbolt, but are not limited thereto. In terms of wireless connection means, the connection device 11 and the connection device 21 may be devices that support communication protocols such as wireless fidelity (Wi-Fi), RFID, Bluetooth, infrared, near-field communication (NFC) or device-to-device (D2D), but are not limited thereto. In some embodiments, the connection device 11 and the connection device 21 may also be network cards that support Ethernet or support wireless network standards such as 802.11g, 802.11n, 802.11ac, but are not limited thereto.

The storage device 12 and the storage device 24 are, for example, any type of fixed or removable random access memory (RAM), read-only memory (ROM), flash memory, hard disk, or similar components, or a combination of the above-mentioned components, and are respectively configured to store a computer program that may be executed by the processor 13 and the processor 25.

The input device 22 is, for example, an input tool configured to detect an input operation by a user such as a keyboard, a mouse, a remote control, a touchpad, and a touch screen.

The display device 23 uses, for example, a liquid crystal display (LCD), a light-emitting diode (LED), a field emission display (FED) or other types of panels to serve as a display panel, and uses a cold cathode fluorescent lamp (CCFL) or the light-emitting diode to serve as a monitor or a television of a backlight module, which may be integrated with a touch panel to form a touch screen, and provide display and operation functions concurrently.

The processor 13 and the processor 25 are, for example, a central processing unit (CPU), or other programmable general-purpose or special-purpose microprocessor, a microcontroller, a digital signal processor (DSP), a programmable controller, an application specific integrated circuit (ASIC), a programmable logic device (PLD), or other similar devices, or a combination of these devices, but the embodiment is not limited thereto. In the embodiment, the processor 13 and the processor 25 may respectively load the computer program from the storage device 12 and the storage device 24, so as to execute a verification method based on the attacking image style transfer according to the embodiment of the disclosure.

Figure 2:
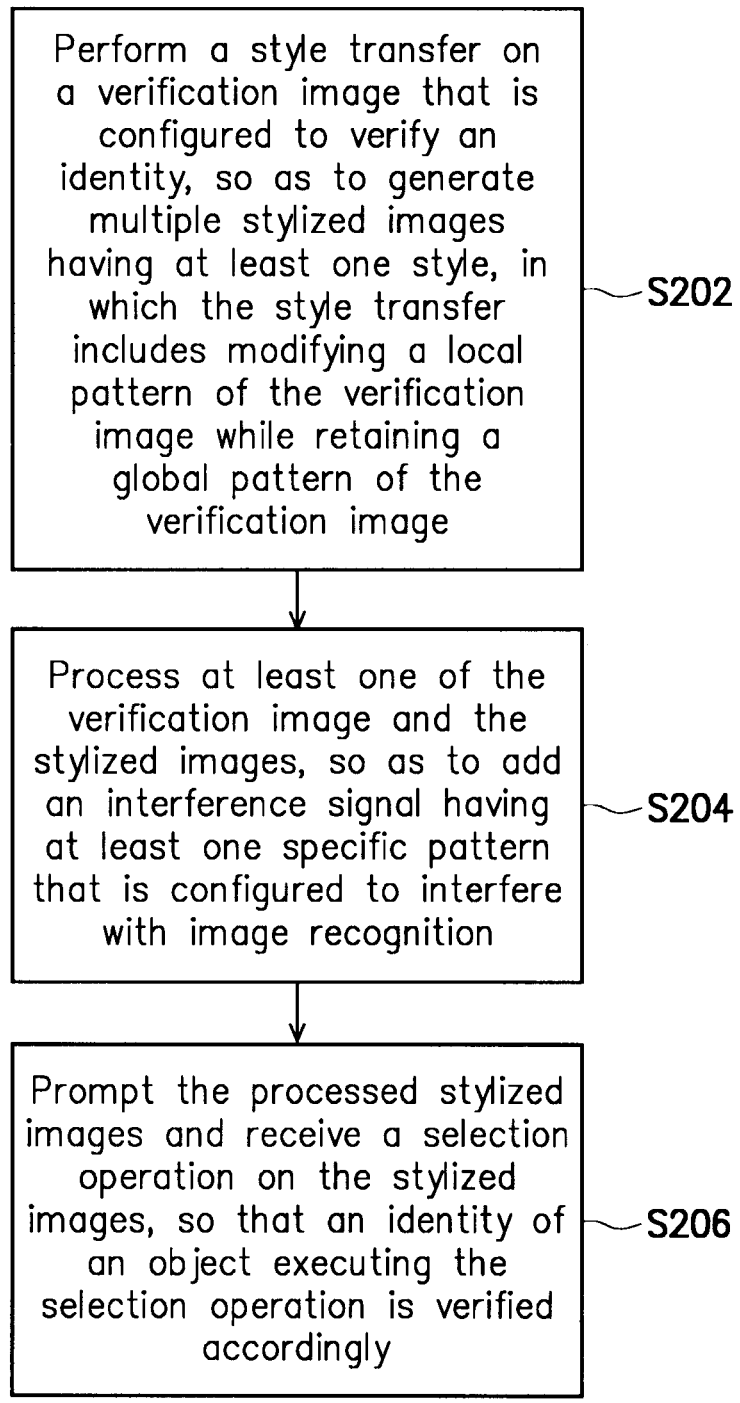
FIG. 2 is a flowchart of a verification method based on the attacking image style transfer according to an embodiment of the disclosure.

FIG. 2 is a flowchart of a verification method based on the attacking image style transfer according to an embodiment of the disclosure. With reference to FIGS. 1 and 2 concurrently, the method of the embodiment is applicable to the verification apparatus in FIG. 1. Detailed steps of the verification method based on the attacking image style transfer in this embodiment are described below in conjunction with various devices and components of the verification apparatus.

In Step S202, in the generation device 10, for example, the processor 13 performs a style transfer on the verification image that is configured to verify an identity, so as to generate multiple stylized images having at least one style. The style transfer includes modifying the local pattern of the verification image while retaining the global pattern of the verification image.

In continuation of the foregoing definition, the style transfer is a process of changing the image style while keeping the image content. According to this definition, the style transfer may be implemented in different manners.

In some embodiments, the processor 13 may use a machine learning model to perform the style transfer. The processor 13 may input the verification image and multiple style images having different styles into a pre-trained machine learning model, so as to extract multiple deep features of the verification image and each of the style images, and replaces the deep features of the verification image with the deeps features of each of the style images, so as to generate stylized images having different styles. The above-mentioned machine learning model is, for example, pre-trained using multiple given content images and multiple given style images, so as to adjust weights of multiple middle layer features of the machine learning model, and the machine learning model learns to restore multiple deep features of each of the content images to a stylized image that has undergone the style transfer. In some embodiments, the processor 13, for example, replaces an average value and a standard deviation of the deep features of the verification image with an average value and a standard deviation of the deep features of each of the style images to implement the style transfer, but this embodiment is not limited thereto.

Figure 3:
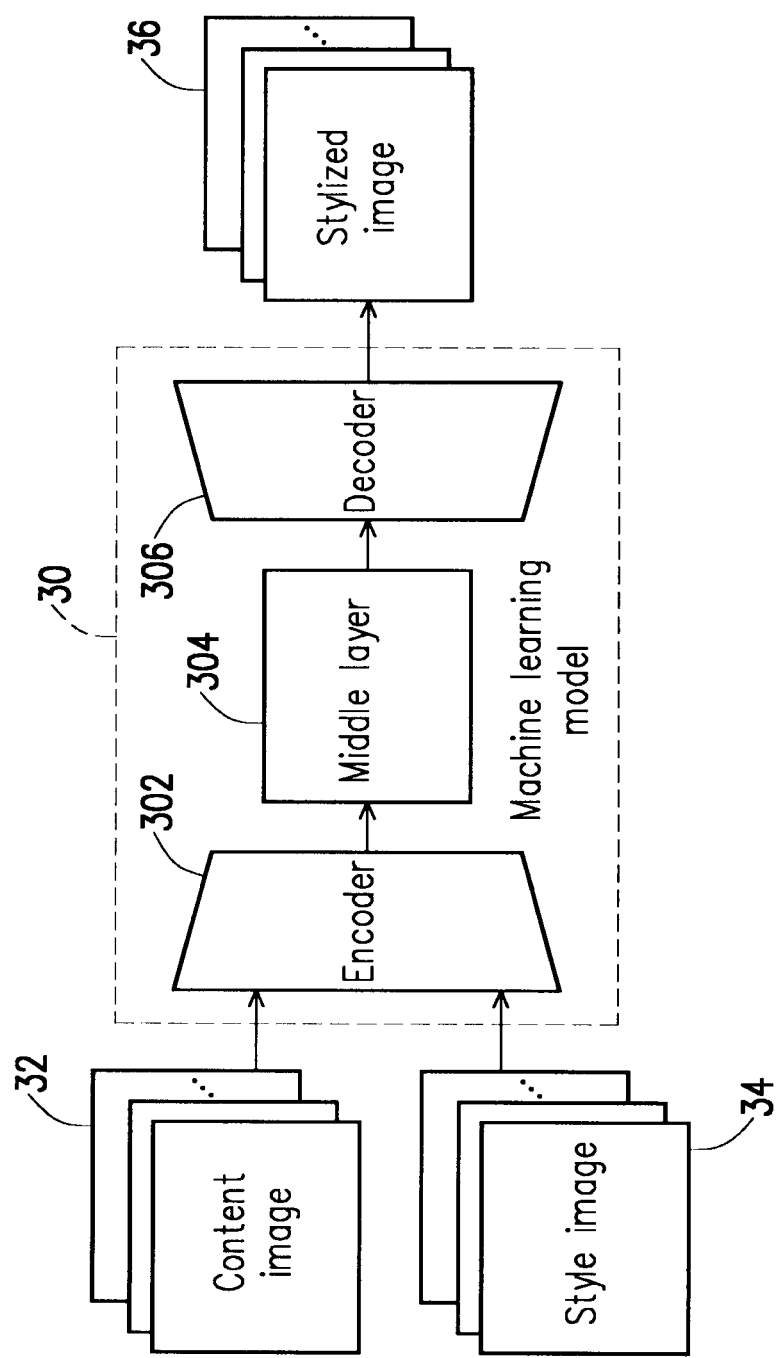
FIG. 3 is a system architecture diagram of using a machine learning model to perform the style transfer according to an embodiment of the disclosure.

For example, FIG. 3 is a system architecture diagram of using a machine learning model to perform the style transfer according to an embodiment of the disclosure. With reference to FIG. 3, a machine learning model 30 according to the embodiment of the disclosure is, for example, a model established by using a convolutional neural network (CNN), which uses multiple content images 32 and multiple style images 34 for training, so as to adjust weights of multiple decoder 306 features of the machine learning model 30, and the machine learning model 30 learns to restore multiple deep features of each of the content images 32 to a stylized image 36 that has undergone the style transfer. In some embodiments, the content images 32 and multiple style images 34 may be used for training other portions of the machine learning model 30 such as the weights of the encoder 302 or the middle layer 304, which is not limited herein.

In some embodiments, the machine learning model 30 uses, for example, adaptive instance normalization (AdaIN) technology, which includes extracting deep features of the content images 32 and the style images 34 through an encoder 302 (for example, a VGG16 model), and is configured to execute AdaIN, which formula is as follows:

$$AdaIN(x, y) = \sigma(y)\left(\frac{x - \mu(x)}{\sigma(x)}\right) + \mu(y)$$

where x and y are respectively the deep features of the content image 32 and the style image 34, $$\mu(z) = \left(\frac{1}{HW}\sum_{h,w} z_{hwc}\right) \text{ and}$$

$$\sigma(z) = \sqrt{\left(\frac{1}{HW}\sum_{h,w}(z_{hwc} - \mu(z)_c)^2\right) + \epsilon}$$

represent an average value and a standard deviation of the deep features, and $z_{hwc}$ represent a pixel value at positions h, w, c of a deep feature z, H, W are length and width of the deep feature, and $\epsilon$ is a selected minimum value, which is used for increasing the numerical stability of denominator of $$\frac{1}{\sigma(x)}.$$

The above-mentioned formula illustrates a calculation of the middle layer 304 of the machine learning model 30 in FIG. 3, which represents replacing a style of the content image 32 with the style image 34. The style may be crafted by deep neural network through the AdaIN technology. Finally, a decoder 306 (for example, a combination of multiple deconvolution layers) restores the middle layer 304 to the stylized image 36 that has been stylized and reaches an optimization goal, thereby completing the style transfer.

The machine learning model may learn how to correctly restore information of the deep network back to the stylized image during the training process, therefore it may be capable of performing the style transfer. This machine learning model may quickly perform the style transfer on many different content images and style images after the training is completed.

In general, a concept of the style transfer is to replace a correlation (including, but not limited to the average value and the standard deviation) of the deep features of the verification image at a level such as a channel or a pixel value with a value of the style images. It should be noted that, considering diversity of style transfer methods, the AdaIN technology described above is only an example, and this embodiment does not limit implementation of the style transfer.

With reference to the flowchart in FIG. 2 again, in Step S204, the processor 13 processes at least one of the verification image and the stylized images, so as to add an interference signal having at least one specific pattern that is configured to interfere with image recognition. The interference includes, but is not limited to, two means of adversarial attack and data poisoning. That is, the added interference signal may include an interference signal with a specific pattern that conforms to the adversarial attack means, or include an interference signal with a specific pattern that conforms to the data poisoning means, or, concurrently including the above-mentioned two interference signals, but this embodiment does not limit the implementation manner.

In detail, a traditional automated program is implemented by means such as corner detection. For bots using such recognition algorithms, the embodiment of the disclosure may effectively block these bots through performing the style transfer on the images. Moreover, in order to increase the difficulty in image recognition by the bot, the embodiment of the disclosure further adds an "attacking" feature during the style transfer process, so as to further increase difficulty in cracking the verification code. The "attacking" feature includes the two techniques of adversarial attack and data poisoning, which are respectively used to block a pre-trained bot and a bot that has been re-trained by collecting verification code data and manual tags. Examples are respectively described in detail as follows.

For the bot based on a "pre-trained machine learning model", the embodiment of the disclosure uses the adversarial attack technique to block it. An adversarial attack is a method that attacks a neural network. This method generates an adversarial example with a clean image mainly through a specific victim model and optimizing a gradient of a target. This adversarial example may effectively mislead judgment of the victim model and greatly reduce accuracy of the judgement, while maintaining the original image. Specifically, the embodiment of the disclosure adds an interference signal that is difficult to detect with a naked eye to the adversarial example, so that a value of a loss function of the image data to which the interference signal is added in a given recognition model is maximized, thereby misleading a judgment result of the neural network.

Figure 4:
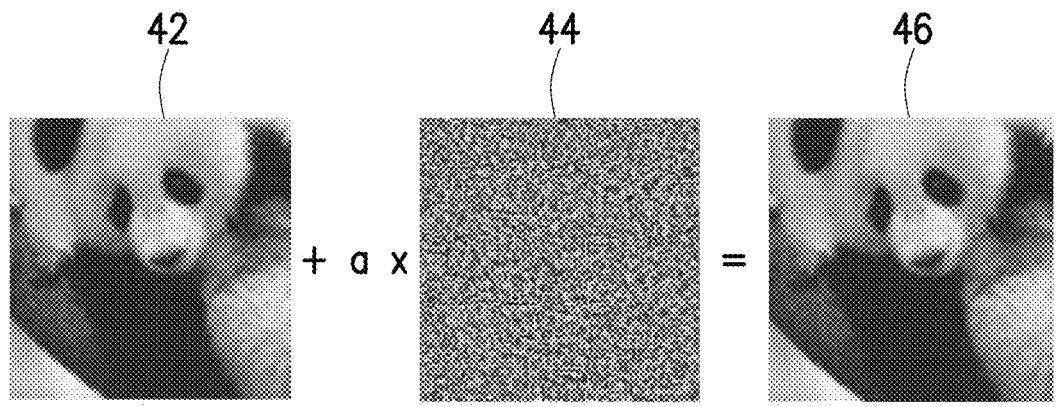
FIG. 4 is an implementation example of an adversarial attack technique according to an embodiment of the disclosure.

For example, FIG. 4 is an implementation example of the adversarial attack technique according to an embodiment of the disclosure. With reference to FIG. 4, the embodiment of the disclosure moves a data point of an original image 42 by a step toward a gradient direction of an objective function (that is, add an interference signal 44 that has been multiplied by a pre-set weight a) to generate a processed image 46, thereby changing judgment by a bot on a victim model from an original panda to a gibbon. The embodiment of the disclosure performs similar processing on the stylized image through the above-mentioned means, which may increase the difficulty in recognizing the stylized image by the bot, and further improves security of the verification code.

In some embodiments, a target of the adversarial attack may be set as:

$$p^*=\mathrm{argmax}_p l_\theta(x_1+p,x_2), \text{given that } \|p\|<\epsilon$$

Where $x_1$ and $x_2$ are arbitrary original images, and $l_\theta$ is a loss function of a given model $\theta$. The above-mentioned formula describes a goal of the adversarial attack as finding a signal p that maximizes the loss function under a certain limit (that is, $\|p\|<\epsilon$). By adding the signal p to the image, a similarity observed between the image $x_1+p$ and the image $x_2$ by the model $\theta$ may be greatly reduced.

Focusing on different purposes such as generation speed, obvious degree of interference, and transferability of the attack, the embodiment of the disclosure may further improve the security of the verification code by mixing different adversarial attack techniques while preserving the image content.

On the other hand, for the bot based on the "re-trained machine learning model", the embodiment of the disclosure uses the data poisoning technique to block it. Data poisoning is a method that attacks the training process. This method assumes that an attacker may control a certain proportion of training data of the neural network. Therefore, an attack adds a signal that is imperceptible to humans to a portion of data points and interferes with the training process through direct poisoning of training data of the neural network, thereby causing the model trained on the poisoned data set to generate defects. These defects include reduced trainability, reduced generalizability, and crafting of backdoors.

First of all, for an attack that reduces the "trainability" of the model, the embodiment of the disclosure adds a low-frequency signal to multiple data points (that is, original data points) of the training data set of the verification image, so as to change an update direction of weights of the machine learning model trained with this training data set, thereby leading to failure of model training. In detail, the attack focuses on a characteristic of the neural network, which is heavy reliance on model architecture and initial weights. The attack misleads the update direction of the weights during the training process through modifying the data points of the training set. When a victim model uses these data for model training, he may find it difficult for the model to reduce its loss function, therefore preventing improvement in accuracy of the model.

Secondly, for an attack that reduces the "generalizability" of the model, the embodiment of the disclosure adds an interference signal to the multiple data points of the training data set of the verification image, so that data kernel of the training data set with the added interference signal and data kernel of the verification image satisfy an objective function. With this method, it is very easy for the victim model to overfit. A principle of this attack is similar to that of the previous attack, but it is mainly for reducing performance of the model on a test set. In practice, when the victim model uses the data set of the attack as the training data, the model may complete the training process and a model after convergence is obtained. However, if the model is placed in a test environment that is unknown at the time of training, its accuracy has no difference from random guessing.

For example, assuming that a machine learning model is approximated by a Gaussian process, and its kernel matrices for training data A and test data B are respectively $K_{A,A}$ and $K_{B,B}$, then the attack may be implemented by the following objective function:

$$p^*=\mathrm{argmax}_p K_{B,A+P}(K_{A+P,A+P})^{-1}(1-e^{\eta K_{A+P,A+P}t})y_A,$$
$$\text{given that } \|p\|<\epsilon$$

Where $y_A$ represents a label of the training data set, $\eta$ is a learning rate, t is training time, $K_{A+P,A+P}$ and $K_{B,A+P}$ are kernel matrices after an interference signal p is added to the training data A.

Finally, for an attack that causes a model to craft a "backdoor" (also known as a backdoor attack), the embodiment of the disclosure adds an interference signal having a specific pattern imperceptible to humans to detect to a training data set and a verification image of the verification image, so that a machine learning model trained with this training data set generates a recognition result corresponding to the specific pattern when the machine learning model recognizes the interference signal having the specific pattern. In detail, the embodiment of the disclosure pre-selects a specific pattern that is imperceptible to humans as a trigger before a victim network is attacked, and uses this trigger to poison a portion of the training data. When a cyber attacker uses the poisoned data to train a machine learning model, the training may still be completed, but the trained model has defects, so that it outputs a recognition result corresponding to the specific pattern when it recognizes the specific pattern.

Figure 5:
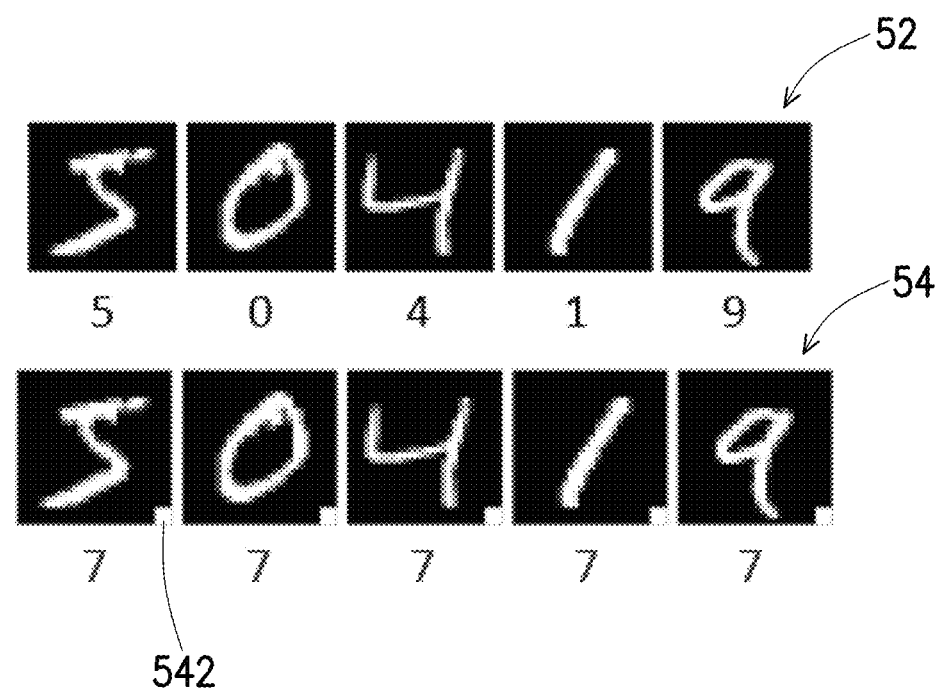
FIG. 5 is an implementation example of a backdoor attack technique according to an embodiment of the disclosure.

For example, FIG. 5 is an implementation example of a backdoor attack technique according to an embodiment of the disclosure. With reference to FIG. 5, for some of original images 52 in a training data set according to the embodiment of the disclosure, a blank square 542 that is imperceptible to humans is placed in a lower right corner of the original images 52 to serve as a trigger, so as to generate poisoned images 54, in which their corresponding labels are set as 7. In a case of a network attacker failing to detect the abnormality and directly using the training data set to train a model, then the trained model will mistakenly believe that a label 7 should be outputted whenever there is a blank square in the lower right corner of the image.

In some embodiments, according to different tasks, the design of the above-mentioned trigger design may be even more inconspicuous. For example, a watermark is added or a single color tone is changed, or even attacking without modifying the label. Diversified triggers may make it difficult for the cyber attacker to detect, thereby enabling the trained machine learning model trained to craft more backdoors.

For the verification code service, adding the foregoing data poisoning attack to a verification code test enables a bot to inadvertently be poisoned when collecting data. Once the bot uses the data for training, its model generates defects, which greatly increases difficulty of training and reduces reliability of the trained model.

In summary, a biggest difference between the foregoing adversarial attack and the data poisoning is that the former attacks a neural network that has completed training, while the latter attacks a training process itself. The embodiment of the disclosure adds the above-mentioned two attacks to the process of a style transfer, thereby effectively blocking bots based on machine learning technology (including bots that use a pre-trained model, or bots that collect a large amount of the verification code data to re-train a model) and increases the security of the verification code.

With reference to the flowchart in FIG. 2 again, after the stylized images having the different styles are generated, in Step S206, the processor 25 of the verification device 20 prompts the processed stylized images on the display device 23, and the input device 22 is used to receive a selection operation on the stylized images, so that an identity of an object executing the selection operation is verified accordingly.

In detail, in order to incorporate the stylized images generated by the foregoing techniques such as the style transfer, the adversarial attack, and the data poisoning into the verification code application such as CAPTCHA, the embodiment of the disclosure proposes a variety of tasks designed according to characteristics of stylization. The tasks include content comparison and content recognition, which are described in detail as follows. The CAPTCHA is referred to as "Completely Automated Public Turing test to tell Computers and Humans Apart", which is a test used in verifying whether the user who is interacting is human.

In a first task, the processor 25 of the verification device 20, for example, displays one of the stylized images generated by the foregoing technology on the display device 23 to serve as a prompt image, displays multiple option images inclusive of at least one stylized image, and then uses the input device 22 to receive a selection operation on the option images by an external object. The processor 25 may verify that the object executing the selection operation is a human being when it determines that the option image selected by the selection operation and the prompt image have the same global pattern, otherwise, it may verify that the object executing the selection operation is a bot.

Figures 6A, 6B:
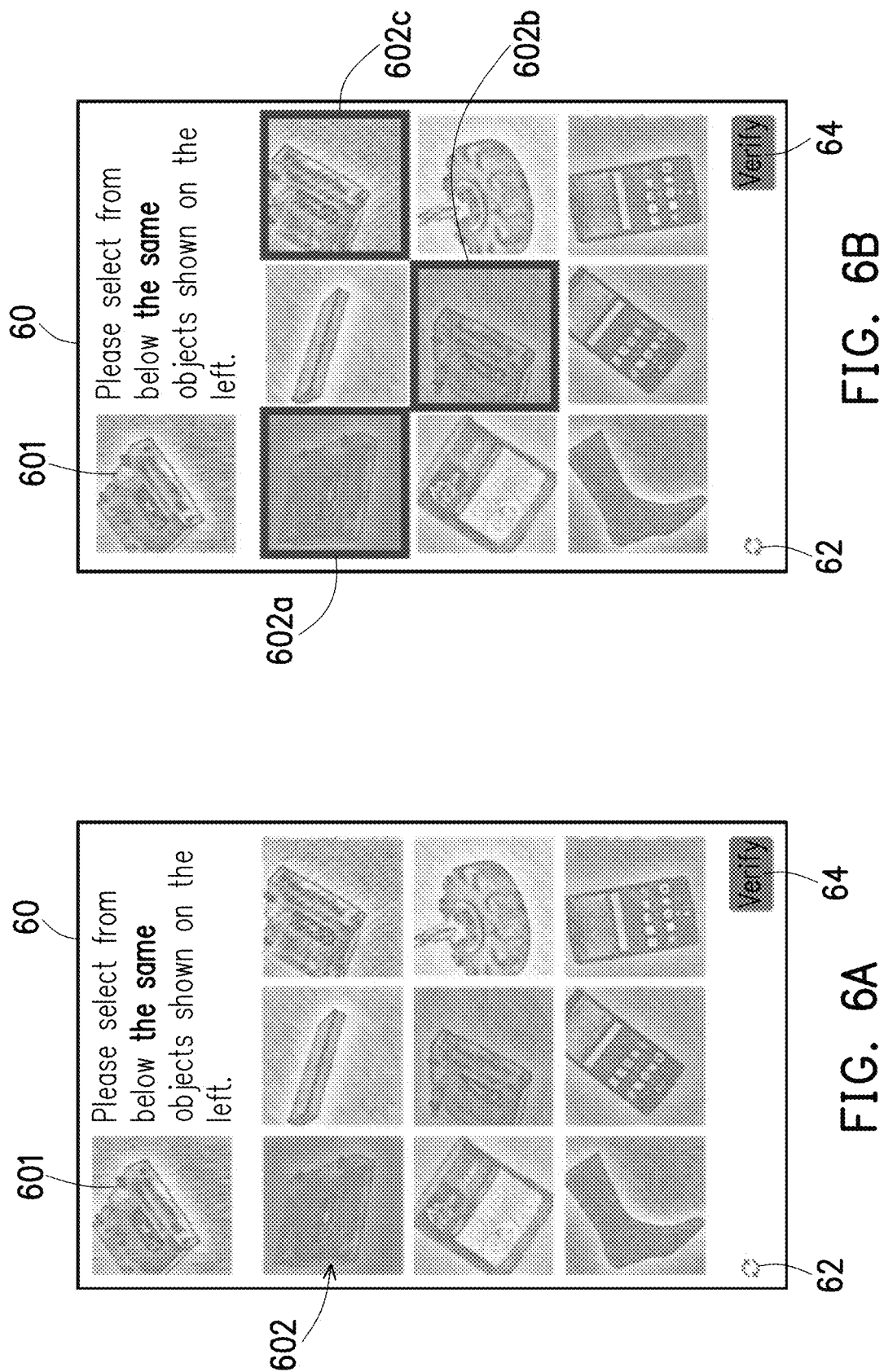
FIGS. 6A and 6B are an implementation example of the verification code test according to an embodiment of the disclosure.

For example, FIG. 6A and FIG. 6B are an implementation example of the verification code test according to an embodiment of the disclosure. With reference to FIG. 6A, in the embodiment, an operation interface 60 is displayed on the display device of the verification device, which includes a prompt image 601 and several option images 602, and further includes a prompt message "select all the pictures that are same as the left picture". An update button 62 is provided in a lower left corner of the operation interface 60, which is configured to update the displayed option image 602, and a verification button 64 is provided in a lower right corner, which is configured to confirm that the selection operation has been completed. A test objective of the embodiment is to identify all images that contain the same content as the prompt image 601 from the option images 602. As shown in FIG. 6B, option images 602a, 602b, and 602c and the prompt image 601 contain the same content. Therefore, when the option images 602a, 602b, and 602c are selected and the verification button 64 is pressed, the verification device may verify that the object executing the selection operation is a human being.

As the above task only requires the object operating the operation to select the same option as the prompt image from the multiple option images, and not to select an image belonging to a specific category, therefore there is no need to tag content of the image, which may omit a lengthy process of manual or automatic classification and tagging of images. In addition, the above tasks only need the verification device to rotate, translate, and scale the original image to perform the style transfer, so as to generate the required option images, therefore it can save computing resources and be applied to various devices.

In a second task, the processor 25 of the verification device 20, for example, displays the multiple option images inclusive of the at least one stylized image on the display device 23. The processor 25, for example, probabilistically modifies the displayed option image to a stylized image or other images when it receives a selection operation on the option images, and the processor 25 may verify that the object executing the selection operation is a human being when all the option images modified by the selection operation have the same global pattern. Otherwise, it may verify that the object executing the selection operation is a bot.

Figure 7A:
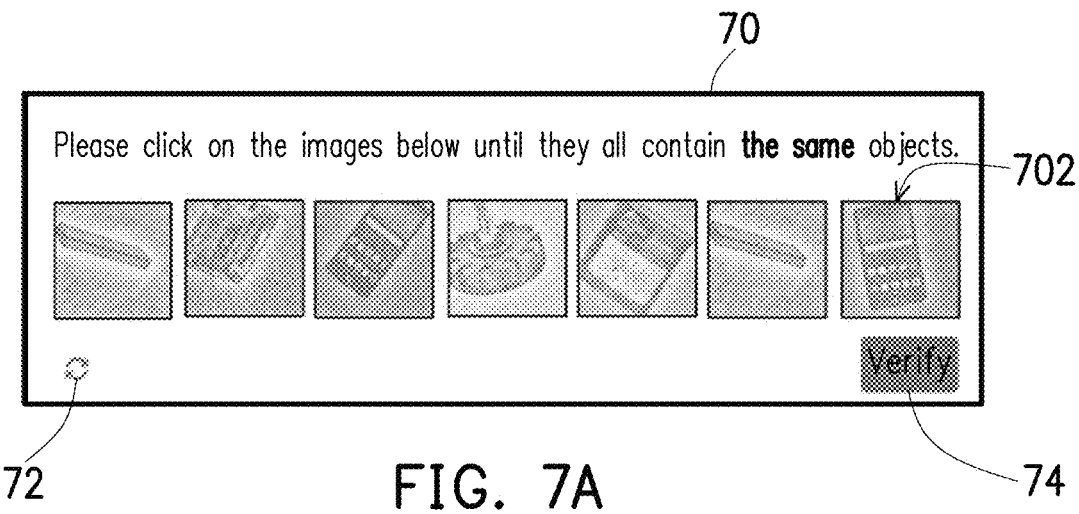
FIGS. 7A to 7C are an implementation example of the verification code test according to an embodiment of the disclosure.
Figure 7B:
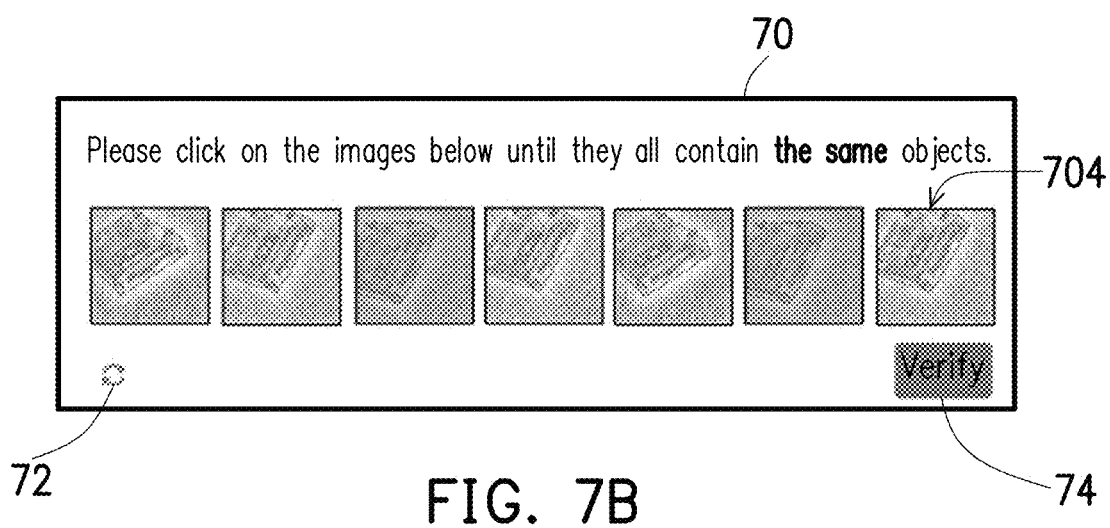
Figure 7C:
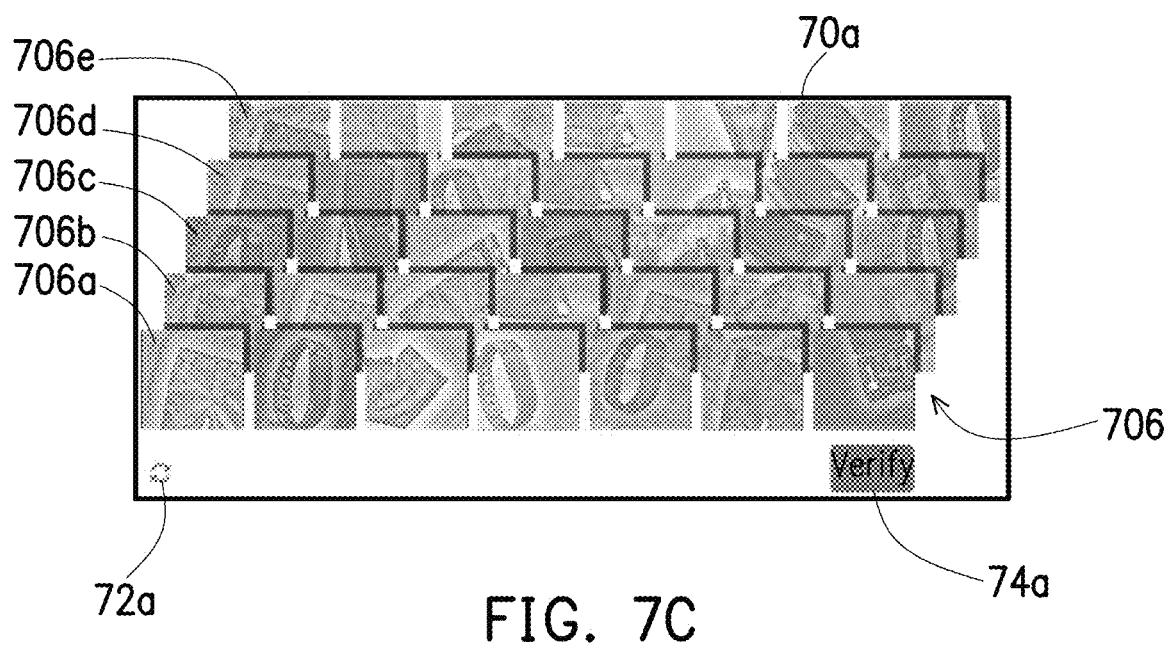

For example, FIGS. 7A to 7C are an implementation example of the verification code test according to an embodiment of the disclosure. With reference to FIG. 7A first, in the embodiment, an operation interface 70 is displayed on the display device of the verification device, which includes 7 option images 702. The option images 702 include, for example, at least one stylized image generated using the foregoing technology. The verification device probabilistically modifies the option image to another stylized image or other images whenever it receives a selection operation on the option images. The probability is, for example, 0% to 100%, and is not limited by the disclosure. After multiple image selections and image modifications, an object executing the selection operation is verified to be a human being when the verification device finally determines that all of the option images modified after the selection operations have the same global pattern (that is, the same content, as shown in an option image 704 in FIG. 7B). Otherwise, the object executing the selection operations is a bot.

It should be noted that as compared to the above-mentioned first task, in which all of the option images are generated independently and are not associated with each other, in the second task, each of the option images and the image modified in response to the selection operation may have certain association. In particular, for the option image at the same location, the subsequently modified image may be determined or generated in a manner that is easier to recognize or harder to recognize (such as changing styles, adding attacks, adding noise or other changes), and difficulty of the modified image may be changed according to accuracy of a selection by an operator or an order of selection. In addition, each of the option images and its subsequent modified images may be interspersed with the above-mentioned attacking features, thereby increasing the difficulty of bot recognition.

For example, as shown in FIG. 7C, an operation interface 70a originally displays 7 option images 706, and multiple option images have been generated behind each of the option images 706 (a stepped display in FIG. 7C is only for illustration, which is not displayed in the implementation). For example, behind an option image 706a, multiple option images 706b to 706e are sequentially associated. In this way, the verification device of the embodiment may modify the option image according to a selection operation whenever the operator executes the selection operation, thereby increasing the difficulty of bot recognition.

In a third task, the processor 25 of the verification device 20, for example, displays multiple stylized images having at least one style, which are cut from a single verification image and have undergone the style transfer, to serve as multiple options images on the display device 23, and uses the input device 22 to receive a selection operation on these option images by an external object. The object executing the selection operation is verified to be a human being when the processor 25 determines that the option image selected by the selection operation may include the global pattern (that is, the image content) of the foregoing single verification image. Otherwise, the object executing the selection operation is verified to be a bot.

Figure 8A:
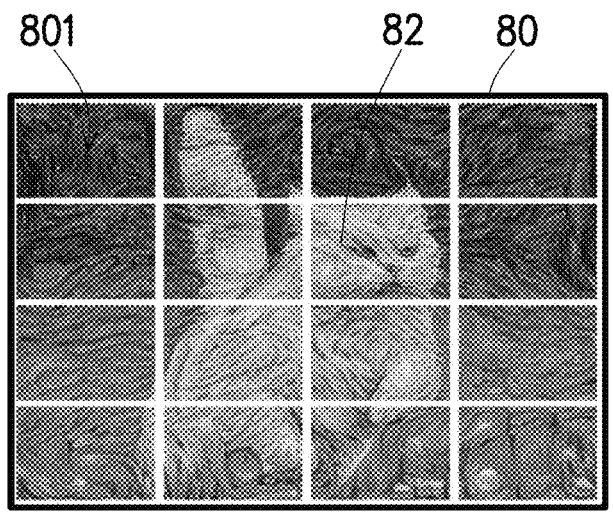
FIGS. 8A and 8B are an implementation example of the verification code test according to an embodiment of the disclosure.
Figure 8B:
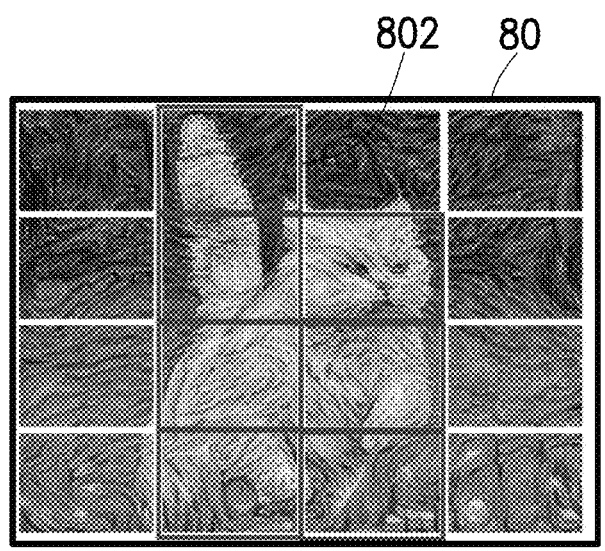

For example, FIG. 8A and FIG. 8B are an implementation example of the verification code test according to an embodiment of the disclosure. With reference to FIG. 8A first, in the embodiment, an operation interface 80 is displayed on the display device of the verification device, which includes 16 stylized images obtained by cutting a single image and performing the style transfer, to serve as option images 801. A test objective of the embodiment is to identify all images containing an image content (that is, a cat) 82 from the option images 801. An object executing a selection operation is verified to be a human being when the verification device determines that the option image operation (a selected image 802 shown in FIG. 8B) selected by the selection may include the image content 82. Otherwise, the object executing the selection operation is verified to be a bot.

All the option images in the above-mentioned embodiments have the same style. However, in other embodiments, the above-mentioned option images may adopt different styles.

Figure 9A:
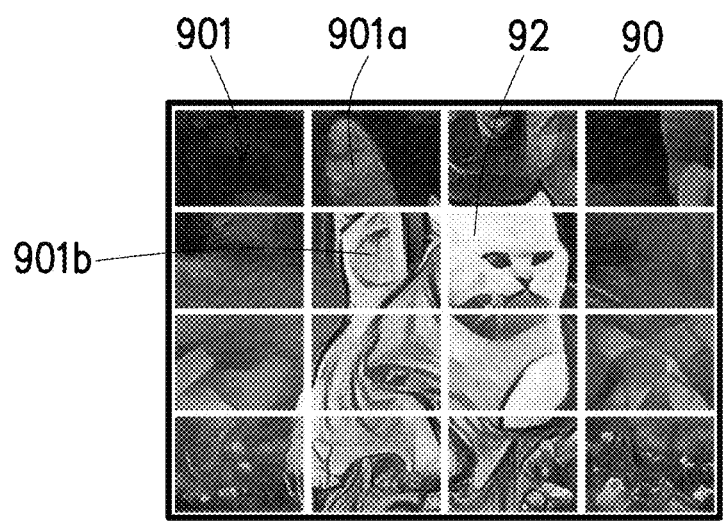
FIGS. 9A and 9B are an implementation example of the verification code test according to an embodiment of the disclosure.
Figure 9B:
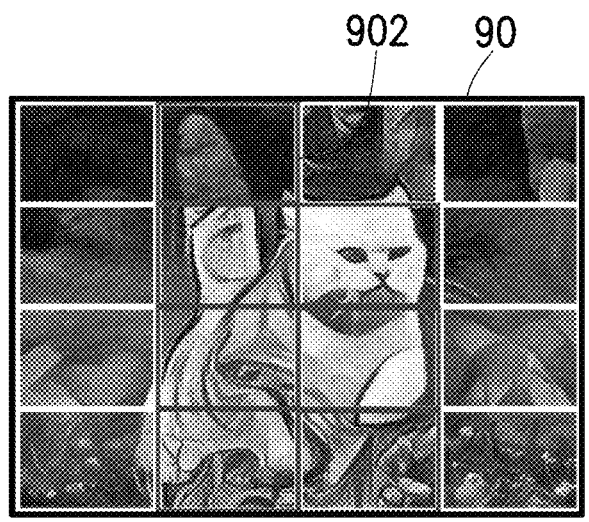

FIGS. 9A and 9B are an implementation example of the verification code test according to an embodiment of the disclosure. With reference to FIG. 9A first, in the embodiment, an operation interface 90 is displayed on the display device of the verification device, which includes 16 stylized images obtained by cutting a single image and performing the style transfer, to serve as option images 901. A difference from the embodiment in FIGS. 8A and 8B is that in this embodiment, the option images 901 may adopt a variety of different styles. For example, an option image 901a and an option image 901b are stylized images having different styles. A test objective of this embodiment is also to identify all images containing an image content (that is, a cat) 92 from the option images 901. An object executing a selection operation is verified to be a human being when the verification device determines that the option image (a selected image 902 shown in FIG. 9B) selected by the selection operation may include the image content 92. Otherwise, the object executing the selection operation is verified to be a bot. In the embodiment, by displaying the option images having different styles, the difficulty in image recognition by the bot can be increased, and the security of the verification code can be improved.

The design of the above-mentioned tasks is highly dependent on the foregoing "style transfer" and "attacking" techniques. The embodiments of the disclosure can interfere with the bot recognition while allowing a human user to give a correct answer by not specifying the styles and the content.

In summary, the verification method and the verification apparatus based on the attacking image style transfer according to the embodiments of the disclosure use the characteristic of the stylization of retaining the image content that can be easily recognized by humans but increases the difficulty of bot recognition, in combination with the techniques such as the adversarial attack and data poisoning to further embed factors that can mislead the judgement of the bots or the training models in the stylized images. In this way, the difficulty in image recognition by the bot can be increased, and the security of the verification code can be improved without affecting the user experience.

Although the disclosure has been disclosed with the foregoing exemplary embodiments, they are not intended to limit the disclosure. Any person skilled in the art can make various changes and modifications within the spirit and scope of the disclosure. Accordingly, the scope of the disclosure is defined by the claims appended hereto and the equivalents.

What is claimed is:

1. A verification method based on an attacking image style transfer, suitable for an electronic device equipped with a processor, the method comprising:
   performing a style transfer on a verification image that is configured to verify an identity, so as to generate a plurality of stylized images having at least one style, wherein the style transfer comprises modifying a local pattern of the verification image while retaining a global pattern of the verification image;
   processing at least one of the verification image and the stylized images, so as to add an interference signal having at least one specific pattern that is configured to interfere with image recognition; and
   prompting processed stylized images, and receiving a selection operation on the stylized image, so as to verify an identity of an object executing the selection operation.

2. The method according to claim 1, wherein performing the style transfer on the verification image that is configured to verify the identity, so as to generate the plurality of stylized images having the at least one style comprises:
   inputting the verification image and at least one style image into a pre-trained machine learning model, so as to extract a plurality of deep features of the verification image and each of the style images, and replaces the deep features of the verification image with the deep features of the each of the style images, so as to generate the stylized images having the at least one style, wherein
   the machine learning model comprises training with a plurality of content images and a plurality of style images, so as to adjust weights of a plurality of middle layer features of the machine learning model, and learning to restore a plurality of deep features of each of the content images to the stylized image that has undergone the style transfer.

3. The method according to claim 2, wherein replacing the deep features of the verification image with the deep features of the each of the style images comprises:
   replacing a correlation of the deep features of the verification image with a correlation of the deep features of the style images.

4. The method according to claim 1, wherein processing the at least one of the verification image and the stylized images, so as to add the interference signal having the at least one specific pattern that is configured to interfere with the image recognition comprises:
adding the interference signal to the stylized images to maximize a value of a loss function of data in a given recognition model of each of the stylized images to which the interference signal is added.

5. The method according to claim 1, wherein processing the at least one of the verification image and the stylized images, so as to add the interference signal having the at least one specific pattern that is configured to interfere with the image recognition comprises:
adding a low-frequency signal to a plurality of data points of a training data set of the verification image, so as to change an update direction of weights of the machine learning model trained using the training data set.

6. The method according to claim 1, wherein processing the at least one of the verification image and the stylized images, so as to add the interference signal having the at least one specific pattern that is configured to interfere with the image recognition comprises:
adding the interference signal to a plurality of data points of a training data set of the verification image, so that a data kernel of the training data set to which the interference signal is added and a data kernel of the verification image satisfy an objective function.

7. The method according to claim 1, wherein processing the at least one of the verification image and the stylized images, so as to add the interference signal having the at least one specific pattern that is configured to interfere with the image recognition comprises:
adding an interference signal having a specific pattern that is imperceptible to humans to a training data set of the verification image and the verification image, so that a machine learning model trained using the training data set generates a recognition result corresponding to the specific pattern when the machine learning model recognizes the interference signal having the specific pattern.

8. The method according to claim 1, wherein prompting the processed stylized images and receiving the selection operation on the stylized images, so as to verify the identity of the object executing the selection operation accordingly comprises:
displaying one of the stylized images to serve as a prompt image, and displaying a plurality of option images comprising at least one of the stylized images;
receiving a selection operation on the option images; and
verifying that the object executing the selection operation is a human being when the option image selected by the selection operation and the prompt image have the same global pattern.

9. The method according to claim 1, wherein prompting the processed stylized images and receiving the selection operation on the stylized images, so as to verify the identity of the object executing the selection operation accordingly comprises:
displaying a plurality of option images comprising at least one of the stylized images;
probabilistically modifying the displayed option images to one of the stylized images or other images when a selection operation on the option images is received; and
verifying that the object executing the selection operation is a human being when all of the option images modified by the selection operation have the same global pattern.

10. The method according to claim 1, wherein prompting the processed stylized images and receiving the selection operation on the stylized images, so as to verify the identity of the object executing the selection operation accordingly comprises:
displaying a plurality of stylized images having at least one style that are cut from a single verification image and have undergone the style transfer to serve as a plurality of option images;
receiving a selection operation on the option images; and
verifying that the object executing the selection operation is a human being when the option image selected by the selection operation comprises the global pattern of the single verification image.

11. A verification apparatus based on an attacking image style transfer, comprising:
a generation device, comprising:
a first connection device;
a first storage device, storing a computer program; and
a first processor, coupled to the first connection device and the first storage device, and is configured to load and execute the computer program in the first storage device to:
perform a style transfer on a verification image that is configured to verify an identity, so as to generate a plurality of stylized images having at least one style, wherein the style transfer comprises modifying a local pattern of the verification image while retaining a global pattern of the verification image;
process at least one of the verification image and the stylized images, so as to add an interference signal having at least one specific pattern that is configured to interfere with image recognition, and generate the processed stylized images; and
a verification device, comprising:
an input device;
a display device;
a second connection device, connected to the first connection device, so as to receive the processed stylized images;
a second storage device, storing a computer program; and
a second processor, coupled to the input device, the display device, the second connection device, and the second storage device, and is configured to load and execute the computer program in the second storage device to:
prompt the processed stylized images on the display device, and use the input device to receive a selection operation on the stylized images, so as to verify an identity of an object executing the selection operation.

12. The verification apparatus based on the attacking image style transfer according to claim 11, wherein the first processor comprises:
inputting the verification image and at least one style image into a pre-trained machine learning model, so as to extract a plurality of deep features of the verification image and each of the style images, and replaces the deep features of the verification image with the deep features of each of the style images, so as to generate the stylized images having the at least one style, wherein
the machine learning model comprises training with a plurality of content images and a plurality of style images, so as to adjust weights of a plurality of middle layer features of the machine learning model, and learning to restore a plurality of deep features of each of the content images to the stylized image that has undergone the style transfer.

13. The verification apparatus based on the attacking image style transfer according to claim 12, wherein the first processor comprises replacing a correlation of the deep features of the verification image with a correction of the deep features of the style images.

14. The verification apparatus based on the attacking image style transfer according to claim 11, wherein the first processor comprises adding a low-frequency signal to a plurality of data points of a training data set of the verification image, so as to change an update direction of weights of the machine learning model trained using the training data set.

15. The verification apparatus based on the attacking image style transfer according to claim 11, wherein the first processor comprises adding the interference signal to a plurality of data points of a training data set of the verification image, so that a data kernel of the training data set to which the interference signal is added and a data kernel of the verification image satisfy an objective function.

16. The verification apparatus based on the attacking image style transfer according to claim 11, wherein the first processor comprises adding an interference signal having a specific pattern that is imperceptible to humans to a training data set of the verification image and the verification image, so that a machine learning model trained using the training data set generates a recognition result corresponding to the specific pattern when the machine learning model recognizes the interference signal having the specific pattern.

17. The verification apparatus based on the attacking image style transfer according to claim 11, wherein the second processor comprises:
displaying one of the stylized images to serve as a prompt image on the display device, and displaying a plurality of option images comprising at least one of the stylized images;
using the input device to receive a selection operation on the option images; and
verifying that the object executing the selection operation is a human being when the option image selected by the selection operation and the prompt image have the same global pattern.

18. The verification apparatus based on the attacking image style transfer according to claim 11, wherein the second processor comprises:
displaying a plurality of option images comprising at least one of the stylized images on the display device;
using the input device to receive a selection operation on the option images;
probabilistically modifying the option image to one of the stylized images or other images when the selection operation on one of the option images is received; and
verifying that the object executing the selection operation is a human being when all of the option images modified by the selection operation have the same global pattern.

19. The verification apparatus based on the attacking image style transfer according to claim 11, wherein the second processor comprises:
displaying a plurality of stylized images having at least one style that are cut from a single verification image and have undergone the style transfer on the display device to serve as a plurality of option images;
using the input device to receive a selection operation on the option images; and
verifying that the object executing the selection operation is a human being when the option image selected by the selection operation comprises the global pattern of the single verification image.

20. The verification apparatus based on the attacking image style transfer according to claim 11, wherein the generation device and the verification device comprise being integrated into a same physical device, the first storage device and the second storage device are a same storage device, and the first processor and the second processor are a same processor.

* * * * *